(12) United States Patent
Kohn (10) Patent No.: US 6,747,421 B2
(45) Date of Patent: Jun. 8, 2004

(54) SELF OSCILLATION CIRCUITS

(76) Inventor: Kazuo Kohn, 332-30 Shitengi, Ohami Shirasato-machi, Sanbu-gun, Chiba-pref. (JP)

( * ) Notice: Subject to any disclaimer, the term of this patent is extended or adjusted under 35 U.S.C. 154(b) by 0 days.

(21) Appl. No.: 10/361,606

(22) Filed: Feb. 11, 2003

(65) Prior Publication Data

US 2003/0151931 A1 Aug. 14, 2003

(30) Foreign Application Priority Data

| Feb. 14, 2002 | (JP) | ........................................ 2002-037171 |
| Sep. 6, 2002 | (JP) | ........................................ 2002-260911 |
| Dec. 24, 2002 | (JP) | ........................................ 2002-372099 |

(51) Int. Cl.[7] .................................................. G05F 1/00
(52) U.S. Cl. ....................... 315/291; 315/307; 315/279
(58) Field of Search ................................ 315/291, 307, 315/224, 279, 276, 282, 194, 209 PZ, 225, 277, 274, 219

(56) References Cited

U.S. PATENT DOCUMENTS

| 6,259,615 B1 | * | 7/2001 | Lin ............................. 363/98 |
| 6,292,339 B1 | * | 9/2001 | Brooks ........................ 361/78 |
| 6,316,881 B1 | * | 11/2001 | Shannon et al. ............. 315/219 |
| 6,326,740 B1 | * | 12/2001 | Chang et al. ................ 315/291 |
| 6,509,700 B2 | * | 1/2003 | Nakatsuka et al. .......... 315/291 |
| 6,515,427 B2 | * | 2/2003 | Oura et al. .................. 315/141 |

* cited by examiner

*Primary Examiner*—Tuyet T. Vo
(74) *Attorney, Agent, or Firm*—Wenderoth, Lind & Ponack, L.L.P.

(57) ABSTRACT

A small size output transformer is capable of stably producing sine wave oscillation at high efficiency. A drive circuit including a switching circuit is connected to DC power source input units and output transformer is connected to the drive circuit. At the drive circuit, the switching circuit is turned on and off based on a feedback signal of a primary side resonance voltage induced in an input side primary winding of the output transformer. The energizing direction of the DC power source to the output transformer is changed in direction by the on and off of the switching circuit, and the power source is applied as an AC signal to the input side primary winding of the output transformer. A phase detecting circuit detects the phase of the resonance wave form at the primary side of the output transformer sand outputs the phase signal. A control circuit connected to the drive circuit converts the signal of the phase detecting circuit to two phase signals of mutually reversed phases and outputs the drive signal for the on-off control of the switching circuit of the drive circuit.

5 Claims, 11 Drawing Sheets

SELF OSCILLATION CIRCUITS

BACKGROUND OF THE INVENTION

1. Field of the Invention

The present invention relates to self oscillation circuits, for use in inverters for driving cold cathode lamps and the like.

2. Description of the Related Art

Figure 11:
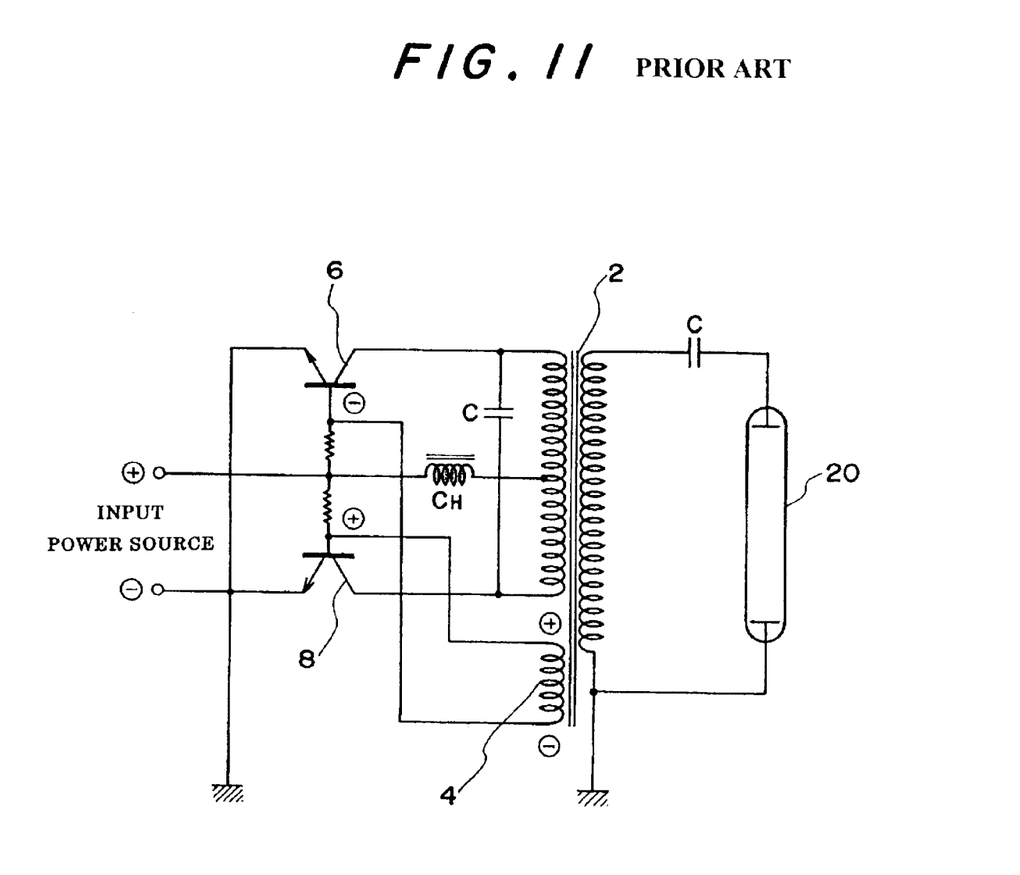
FIG. 11 is a circuit diagram showing conventional technology of the self oscillation circuit.

In order to light up backlights of televisions, notebook computers, desktop computers, PDAs and the like using liquid crystal display devices, inverters of high tension AC output are required. The inverters of this kind have been used from discrete construction type, but ICs of exclusive type have been desired to be employed from among light, thin, short and small size type ICs. FIG. 11 shows a self oscillation circuit in a conventional Loyer system. In such a self oscillation circuit, in order to self oscillation, an F winding 4 (normally, it is called a detection winding or feedback winding) is provided for detection of resonance frequency in a winding type transformer, and with its signal, transistors 6 and 8 are driven with its own oscillation frequency, namely, resonance frequency type transformer 2, whereby the oscillation continues while always automatically tracking to the resonance frequency of winding type transformer 2.

Furthermore, in U.S. Pat. Ser. No. 6,316,881 and U.S. Pat. Ser. No. 6,259,615, self oscillation circuits are disclosed where a plurality of switch networks are controlled of their make and break according to resonance oscillation at a secondary side of a tank circuit and a DC signal is converted to an AC signal.

The ICs of this kind, which are recently in the market, are of separate excitation system without exception. For this reason, the present situation is such that a deterioration of efficiency due to changes, such as ambient environment temperature and the like, because of such system, and a total evaluation bring about undesired results. Now, the reason for employing the separate excitation system results from giving a priority to the installation rather than merely to the performance. Namely, for the elimination of a feedback winding that detects resonance frequency of the transformer, as well as the convenience of keeping a creeping distance between a high tension portion and a low tension portion in a case of laying out a substrate with the transformer having input 2 terminals and output 2 terminals. Under the circumstances, if the self commutation system can be materialized by using a transformer without the feedback winding, it is not subjected to environment temperature, and the oscillation frequency always are automatically tracks to the resonance frequency of the transformer; it is constantly driven at optimum efficiency; and also its layout can be easily arranged on account of the absence of the feedback winding when component parts are arranged in the circuit.

However, in the self oscillation circuit eliminating the feedback winding that is employed in the winding type transformer, a system of detecting a resonance frequency from the secondary side of the winding type is generally employed. For this reason, there is a need for increasing the number of windings at the secondary side in order to generate a required voltage at the secondary side of the winding type since high resonance voltage is not generated at the primary side, and which results in a large size winding type transformer and at the same time, increases cost and deteriorates efficiency, which are problems.

A primary object of the present invention is to provide a self oscillation circuit that has a high efficiency with stability.

Furthermore, another object of the present invention is to operate the transformer efficiently by producing it in smaller size in the self oscillation circuit using the transformer.

SUMMARY OF THE INVENTION

The present, invention is constructed in such a way that, a drive circuit is connected to a transformer having a resonance circuit at its primary side. In the drive circuit, a switching circuit for turning on and off the DC voltage is provided in the drive circuit. In the drive circuit, the switching circuit is turned on and off on the basis of a feedback signal of resonance voltage at the primary side induced in the primary winding at an input side of the transformer, a direction of flowing electric current to the transformer is converted to a clockwise direction or a counter-clockwise direction, and is input, as an AC signal to the primary winding at the input side of the transformer. A phase detecting means detects a phase of a resonance wave form at the primary side of a winding type transformer and outputs a phase signal. A control circuit connected to the drive circuit outputs a drive signal that controls the switching circuit by on-off manner on the basis of the output signal of the phase detecting means.

DETAILED DESCRIPTION OF THE INVENTION

The present, invention will be described in detail by referring to embodiments of the present invention that illustrate in the drawings attached herewith.

Figure 1:
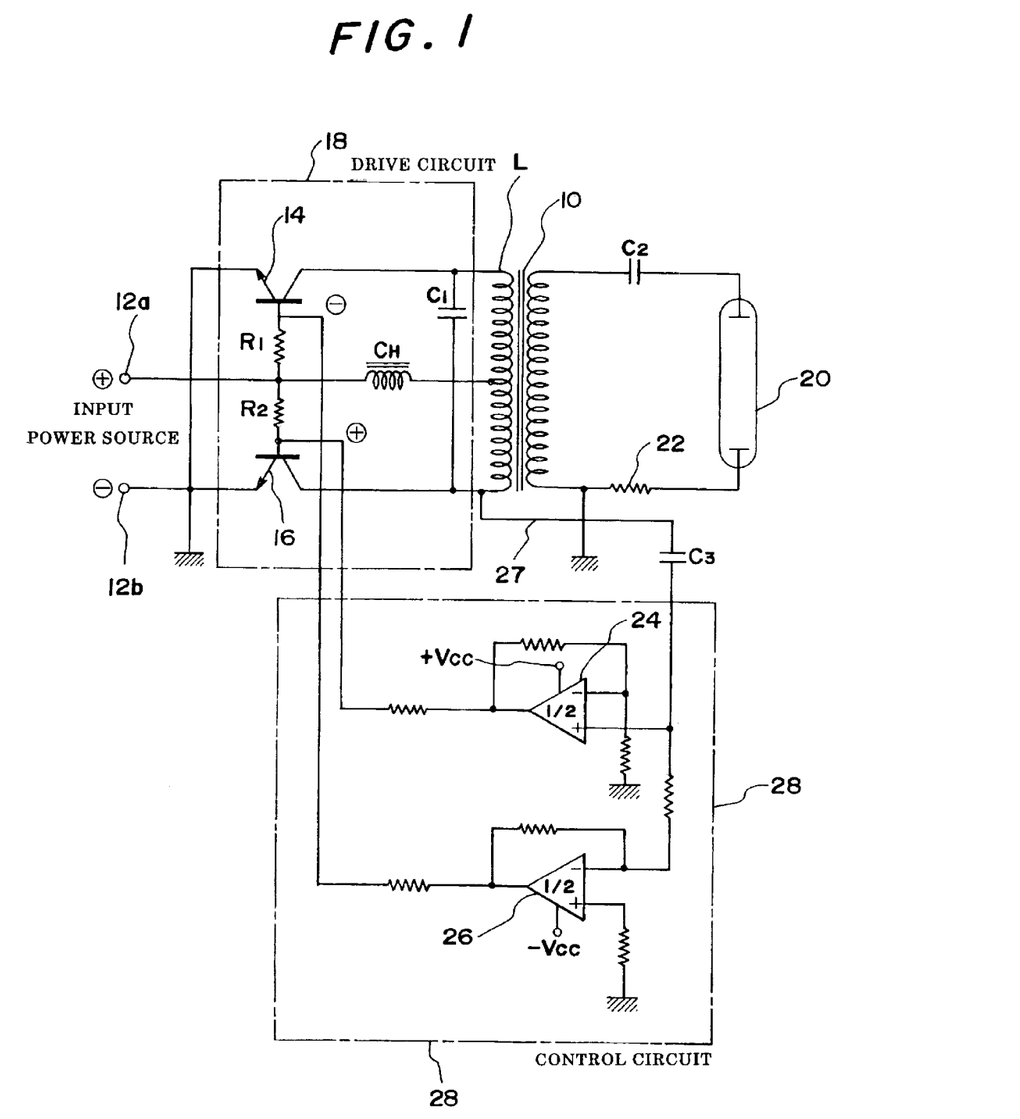
FIG. 1 is a circuit diagram of a self oscillation circuit showing an embodiment of the present invention.

In FIG. 1, numeral 10 denotes a winding type transformer with one primary side winding and one secondary side winding, and its structural feature is that a feedback winding for detecting a resonance frequency is not provided. Between the DC input power source terminals 12af 12b and the primary side of the winding type transformer 10, a drive circuit 18 of a pushpull drive system is provided and its structural elements are switching elements 14, 16 consisting of NPN transistors. Bases of the switching elements 14 and 16 are connected to the positive terminal 12*a* by means of resistors R1 and R2, respectively, and are connected to an intermediate tap of the winding type transformer 10 by means of a chalk (CH). Emitters of the switching elements 14, 16 are connected to the negative terminal 12*b*. Between both terminals of the primary side of the winding type transformer 10, a resonance capacitor (C1) is provided. Numeral 20 denotes a cold cathode type fluorescent lamp (CCFL), and one electrode of the CCFL 20 is connected to one terminal of the secondary side of the winding type transformer 10 by means of a ballast capacitor (C2), and another electrode of the CCFL 20 is connected to another terminal of the secondary side of the winding type transformer 10 by means of a resistor element 22. Numerals 24, 26 denote operational amplifiers, and a phase signal whose phase is corrected by 90° by a phase correction circuit, illustration of which is omitted, is supplied from a lead wire 27 outputting a resonance frequency wave form of the primary side of the winding type transformer 10. The operational amplifiers 24, 26 are provided in a control circuit 28 that amplifies the corrected phase signal and converts this phase signal to two output signals of mutually different phases by 180°, namely, which are in a reversed phase relation. A terminal of the lead wire 27 is connected to the terminal of a primary winding of the winding type transformer 10 and the other terminal of the lead wire 27 is connected to a counter-reversal (positive) input terminal of the operational amplifier 24 and a reversal (negative) input terminal of the operational amplifier 26. A resonance frequency phase signal at primary side of the winding type transformer 10 that is input from the lead wire 27 to the operational amplifiers 24, 26 is amplified with the operational amplifiers 24, 26 and the operational amplifiers 24, 26 output signals in the same phase, but offset by 180° from each other. Wiring supplies an output voltage of the operational amplifier 26 to the base of the switching element 14. Wiring also supplies an output voltage of the operational amplifier 24 to the base of the switching element 16. Output voltages of mutually different phases by 180° of the operational amplifiers 24, 26 produce signals equal to feedback signals at both terminals of the conventional winding type transformer. In FIG. 1, R1 and R2 denote resistors.

For reference, the switching elements 14, 16 can be employed from bipolar transistors, field-effect type transistors (PET) and the like, and also, the control circuit 28, in addition to the operational amplifiers 24, 26 can be employed by logic elements, comparators and the like, and those elements or circuits are not particularly limited to the operational amplifiers.

In the foregoing construction, when the power source switch is turned on, an ON signal is instantly supplied to either base of the switching elements 14, 16 from a separately provided logic circuit. Thereafter, a DC power source is supplied to the primary winding of the winding type transformer 10 from the DC input power source terminals 12*a*, 12*b*. When the primary winding of the winding type transformer 10 is energized, the primary side of the winding type transformer 10 induces resonance voltage at the secondary side of the winding type transformer 10 and the frequency wave form phase signal of the resonance voltage at the primary side is detected in the form of a trigger signal from the lead wire 27. This trigger signal is converted to a pulse signal for producing a half cycle signal of ON of the switching element by a circuit (illustration omitted) for producing a pulse signal from a trigger signal, such as a monostable multivibrator (monomulti), provided between a capacitor (C3) and the control circuit 28, and this pulse signal is input to the control circuit 28. Output signals of the control circuit 28 which are mutually different phase by 180° are supplied to the bases of the switching elements 14, 16, and the switching elements 14, 16 are turned on and off by following the resonance frequency at the primary side of the winding type transformer 10 to cause the drive circuit 18 to be self oscillated.

The oscillation frequency of this self oscillation always automatically follows to the resonance frequency at the primary side of the winding type transformer 10, and the drive circuit 18 is constantly operated at the best optimum efficiency. Alternating voltage caused at the secondary side of the winding type transformer 10 is supplied to the CCFL 20, and the cold cathode type fluorescent lamp 20 lights on. Brightness control of the cold cathode type fluorescent lamp 20 is performed by supplying a burst signal to the bases of the switching elements 14, 16 from the outside. When the winding type transformer 10 is operated with the resonance frequency at, the primary side, the voltage at the primary side becomes considerably higher than the power source voltage being supplied. With this operation, the winding type transformer 10 can be made smaller in size, which results in saving of space and cost reduction. Namely, in a case of providing a desired secondary voltage, the resonance voltage considerably higher than the power source voltage is produced by the resonance despite of the fact that the voltage to be supplied to the primary side of the transformer 10 is the power source voltage, and the number of secondary windings can be reduced compared with the conventional windings from the relationship between the voltage and the number of primary windings.

The foregoing embodiment is characterized in that a pushpull drive system is employed for the drive circuit, and a mid point tap of the winding type transformer is utilized whereby the drive circuit can be produced with two pieces of the transistors.

Figure 2:
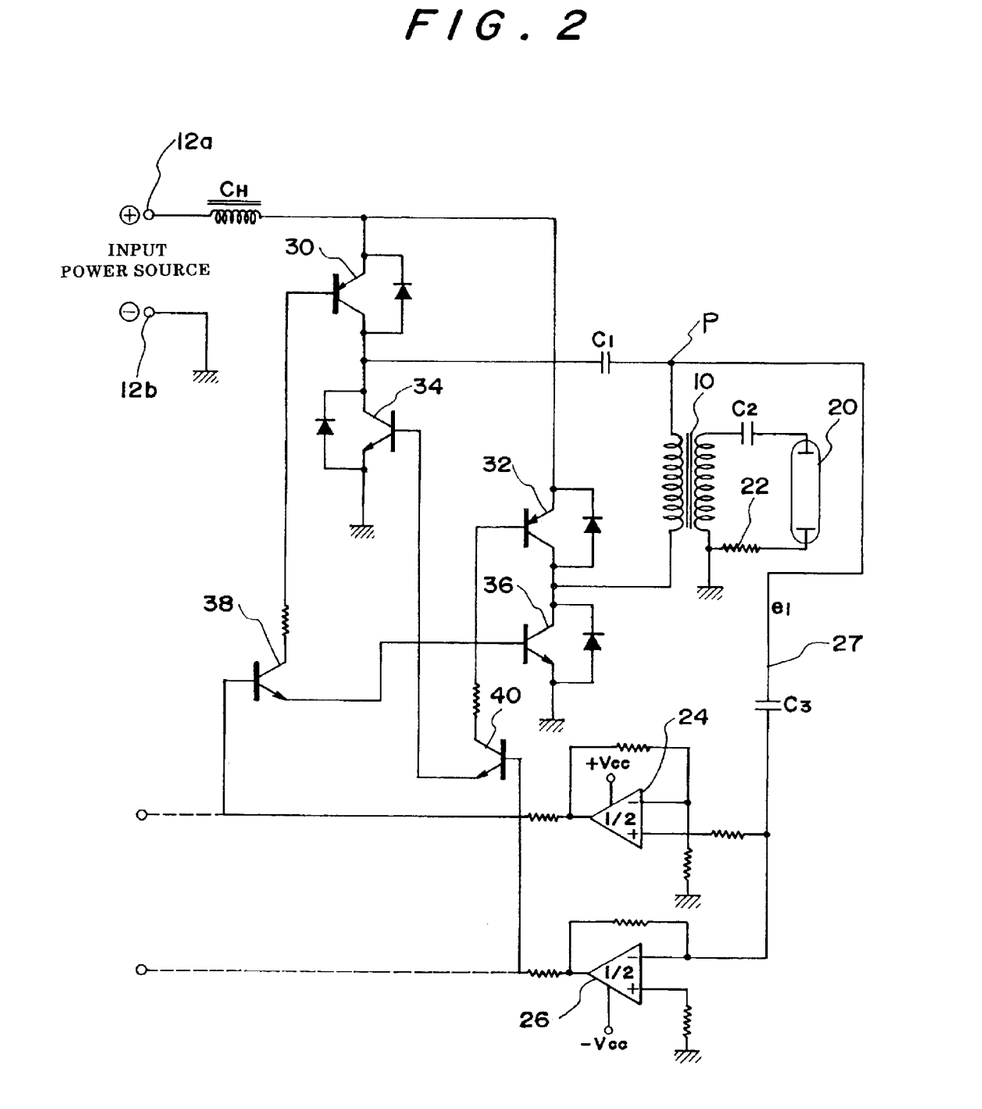
FIG. 2 is a circuit diagram of a self oscillation circuit showing another embodiment of the present invention.

In a case of not utilizing the mid point tap of the winding type transformer for the drive circuit, as shown in FIG. 2, a drive circuit of a full bridge system is employed. Emitters of switching elements 30, 32 consisting of PNP transistors are connected to a DC input power source terminal 12*a* at the plus side by means of a chalk (CH), and collectors of switching elements 34, 36 consisting of NPN transistors, emitters of which are grounded, are connected to respectively collectors of the switching elements 30, 32. The collector of the switching element 30 is connected to a terminal at the primary side of the winding type transformer 10 by means of a resonance capacitor (C1), and the collector of the switching element 32 is connected to the other terminal at the primary side of the winding type transformer 10. A series resonance circuit at the primary side of LC is composed of the resonance capacitor (C1) and the winding at the primary winding of the winding type transformer 10.

A base of an on-off control element 38 consisting of NPN transistors is connected to an output terminal of the operational amplifier 24, and a base of an on-off control element 40 consisting of NPN transistors is connected to an output terminal of the operational amplifier 26. Each collector of the on-off control elements 38, 40 is connected to bases of the corresponding switching elements 30, 32, and each emitter of the switching elements 38, 40 is connected to bases of the corresponding switching elements 36, 34 as shown in the drawing. The operational amplifiers 24, 26 constitute a control circuit, and a counter reversal terminal of the operational amplifier 24 and a reversal terminal of the operational amplifier 26 are connected to a mid point P of the LC series resonance circuit at the primary side of the winding type transformer 10 by means of a phase detecting means consisting of lead wires 27 connected to the capacitor (C3). A ballast capacitor (C2), cold cathode type fluorescent, lamp 20, and resistance element, 22 are connected to the secondary side of the winding type transformer 10. The other terminal at the primary side of the winding type transformer 10 is connected between collectors of the switching elements 32, 36 and the other terminal at the secondary side of the winding transformer is grounded.

In the foregoing construction, when the power source switch is turned ON, and the ON signal from the logic circuit (illustration omitted) is instantly supplied to either of the on-off control elements 38, 40, the winding type transformer 10 is energized with the DC power source through the switching elements 30, 36 or the switching elements 32, 34. With the energization, the resonance voltage is generated at the primary side of the winding type transformer 10, and the phase signal of this resonance voltage is corrected of its phase by 90° by the phase correction circuit not shown in the drawing, and is supplied to the control circuit by the lead wire 27. The output voltages of the control circuit which are mutually different in their phase by 180° are supplied to the bases of the on-off control elements 38, 40 consisting of transistors, and the on-off control elements 38, 40 are turned on and off in correspondence to the resonance frequency at the primary side of the winding type transformer 10. The positive voltage from the operational amplifier 26 is supplied to the base of the on-off control element 40, and when the on-off control element 40 is turned on, the switching elements 32, 34 are turned on, and the primary side of the winding type transformer 10 is energized through the switching elements 32, 34. When the voltage to be supplied to the base of the on-off control element 40 becomes negative, the switching elements 32, 34 are shut out. When the on-off control element 38 is turned on, the switching elements 30, 36 are turned on, and the primary side of the winding type transformer 10 is energized through the switching elements 30, 36, and the drive circuit performs the self oscillation in correspondence to the resonance frequency at the primary side of the winding type transformer 10 by the operation. The brightness control of the cold cathode type fluorescent lamp 20 can be performed by supplying the burst signal to the bases of the on-off control elements 38, 40 from the outside. For reference, in FIG. 2, the switching elements 30, 32, 34, 36 and the on-off control elements 38, 40 constitute a drive circuit that turns the switching elements on and off by the drive signal on the basis of the feedback signal of the resonance voltage at the primary side induced at the primary winding of the input side of the winding type transformer 10 and an energizing direction of the DC power source to the winding type transformer 10 is converted in positive and negative directions by the on-off operation, and inputting the input power source to the primary winding at the input side of the winding type transformer as the AC signal.

In order to oscillate an LC series resonance circuit by the electric current drive in having a combination of semiconductor switching elements, there is a necessity of controlling the electric current in a positive direction of driving the LC series resonance circuit. For this purpose, a digital signal coinciding with a code of the resonance electric current is generated on the basis of a signal whose phase is delayed by 90° from the resonance voltage of the mid point (a coupling point of L and C) of the LC series resonance circuit, and the resulting signal is made as a fundamental timing of the switching. With this setting, the self excitation can be performed without a return winding by providing a positive return of the electric current flowing in the LC resonance circuit through a simple digital circuit. Furthermore, even if the frequency of the LC series resonance circuit changes by the change of the condition of loads, the oscillation frequency follows automatically as a feature of the self-excitation oscillation so that stable sine wave oscillation can be maintained.

As a separate detecting method of a phase signal of the resonance voltage frequency at the primary side of the winding type transformer 10, a magnetic resistance element or a Hall element may be buried in a winding of the winding type transformer or core gaps so that a phase signal of the resonance frequency at the primary side of the winding type transformer 10 may be detected. In FIG. 2, when a signal is supplied to the bases of the on-off control elements 38, 40 with an output voltage of the operational amplifiers 24, 26, a voltage of about 3–4 V is desirable when taking into consideration counter-pressure resistance between the base and emitter of the transistor. Whereas, in a case of using an input power source correction circuit, an automatic level adjusting circuit may be provided at an input side of the operational amplifiers 24, 26 to meet with a vertical motion of the phase detecting signal (e1).

Figure 3:
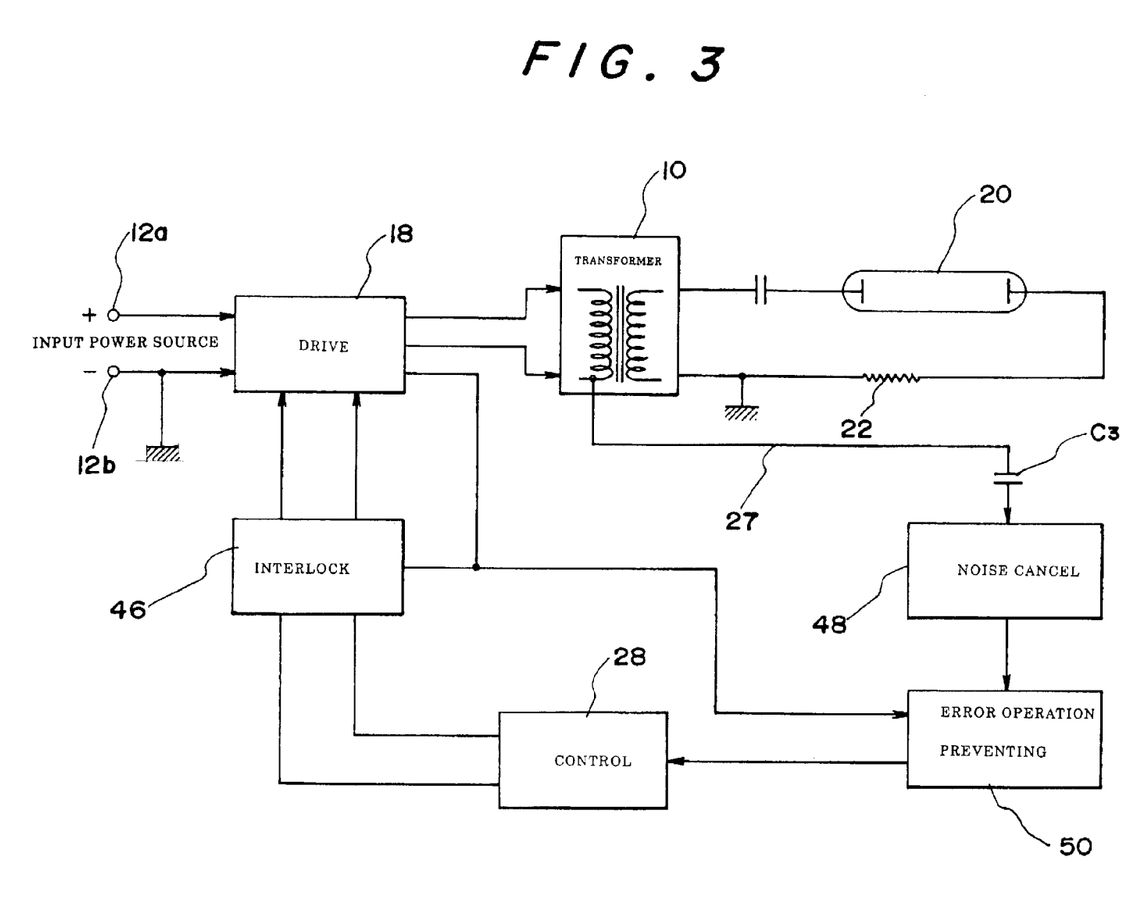
FIG. 3 is a block circuit diagram of a self oscillation circuit showing another embodiment of the present invention.

Furthermore, as an application example of the embodiment of this invention, a plurality of winding type transformers 10 may be connected in series or parallel and a plurality of the winding type transformers 10 may be operated simultaneously. And then, a plurality of the cold cathode type fluorescent lamps 20 may be connected in parallel to the secondary side of the winding type transformer 10. In both cases, the winding type transformers 10 or the cold cathode type fluorescent lamps 20, the units may be caused to oscillate automatically with the resonance frequency whereby the operation can be made without excessively lowering the efficiency. In the embodiments shown in FIGS. 1, 2, when an incoming noise of some kind enters into the operational amplifiers that constitute the control circuit, an interlock circuit 46 that prevents the noises from effecting the switching elements 14, 16 or the on-off control elements 38, 40 may be provided at a detecting unit or an output unit of the control circuit 28 as shown in FIG. 3 whereby a positive performance can be obtained. Furthermore, a more positive performance can be obtained by supplying a primary resonance phase signal from the lead wire 27 to an error operation preventing circuit 50 by means of a noise cancel circuit 48 and supplying an accurate primary side resonance phase signal from the error operation preventing circuit 50 to the control circuit 28.

Next, an embodiment using field effect type transistors (FET) in switching elements will be described by referring to FIG. 4.

Figure 4:
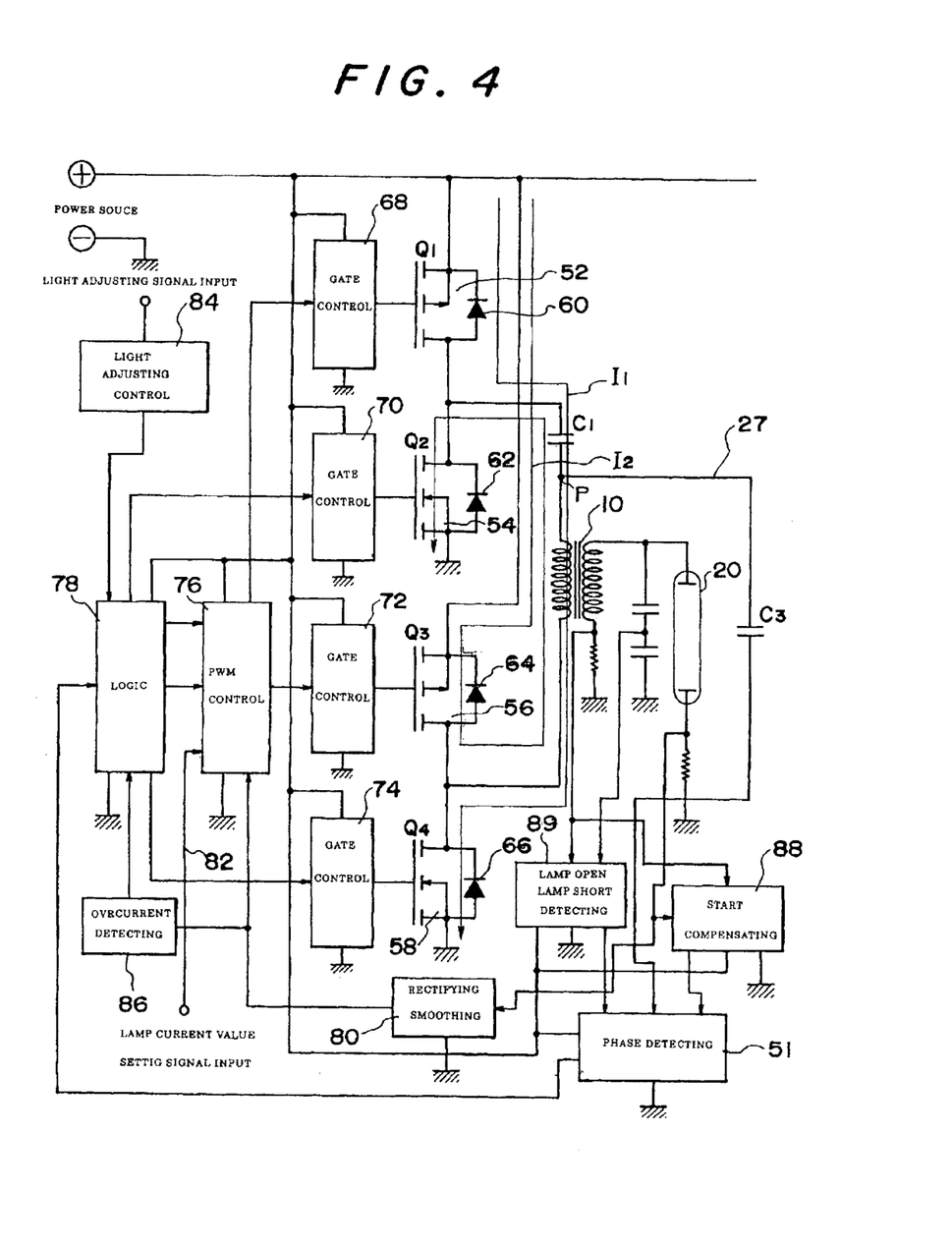
FIG. 4 is a block circuit diagram of a self oscillation circuit showing another embodiment of the present invention.

In FIG. 4f numerals 52, 54, 56, 58 are switching elements made of FETs, and commutation diodes 60, 62, 64, 66 are connected between a source and drain of each switching element. Gate control circuits 68, 70, 72, 74 are connected to each gate of the switching elements 52, 54, 56 and 58, and among the circuits, the gate control circuits 68, 72 are connected to a PWM control circuit 76, and the gate control circuits 70, 74 are connected to a logic circuit 78. The PWM control circuit 76 receives a signal from a rectifying smoothing circuit 80 that detects an electric current flowing in the lamp 20 and controls a conductance angle of the switching elements 52, 56 to make a level of this signal to be a set value given by a line 82. The phase detecting circuit 51 is connected to a mid point P of the LC series resonance circuit by means of a lead wire 27 and a capacitor (C3). The logic circuit 78 is so constructed that a signal is produced for turning the switching elements to on and off on the basis of a resonance phase signal at primary side from the phase detecting circuit 51 connected to the lead wire 27 and transmits an on-off control signal to the gate control circuits 68, 72 by means of the PWM control circuit 76 and transmits the on-off control signal to the gate control circuits 70, 74. The phase detecting circuit 51 supplies a correction phase signal delayed by 90° from the phase voltage signal of the mid point P of the LC series resonance circuit to the logic circuit 78. This signal becomes identical in phase with that of the electric current flowing in the LC series resonance circuit at the primary side. The electric current flowing in the LC series resonance circuit at the primary side is such that even if a charging voltage of a capacitor C1 reaches DC power source voltage, the voltage of the terminal at the primary side of the transformer 10 lowers further after exceeding OV upon passage of a phase time of 90° electrically and furthermore, it becomes a maximum negative value upon passage of the phase time by 90°. At this time, the signal delayed by 90° from this voltage becomes OV so that the switching control signal is turned to the on-off at this timing. The logic circuit 78 alternately transmits the switching control signals as explained above. The logic circuit 78 is so constructed that it produces a light adjusting control signal on the basis of the output signals of a light adjusting control circuit 84 to which light adjusting signals are transmitted and controls switching pulse width of the PWM control circuit 76 and burst control of on-off of switching elements by light adjusting control signals to keep the luminance of the lamp 20 constant and sets luminance to an optional value ranging from luminance zero to 100% on the basis of light adjusting signals. Moreover, the logic circuit 78 is constructed to be connected to an overcurrent detecting circuit 86, and when the overcurrent flows into the lamp 20, the logic circuit 78 detects it, and prevents the overcurrent by sending a signal for preventing the overcurrent to the PWM control circuit 76.

A start compensating circuit 88 is so constructed that it is connected to the secondary winding of the winding type transformer 10 and the lamp 20, and an electric current signal of the secondary winding and the lamp 20 is supplied to the start compensating circuit 88. The start compensating circuit 88 inputs a start compensating signal to the phase detecting circuit 51 to assure a positive start of a self oscillation circuit when the power source is turned on and off. The phase detecting circuit 51 receives this start compensating signal and outputs the start signal for self oscillation to the logic circuit 78. Regarding the start compensating circuit 88, a phase corrected signal from the phase detecting circuit 51 is supplied to the logic circuit 78 and sometimes the lamp 20 does not begin discharging even though the electric current flows to the primary side of the transformer 10. The start compensating circuit 88 is provided for start compensation for such a case. In this case, in order to positively light the lamp 20, the start compensating circuit 88 judges whether or not the lamp 20 lights after detecting the electric current flowing to the lamp 20 or the secondary side of the transformer 10 and when the lighting does not occur, it sends the start compensating signal to the phase detecting circuit 51 until the lamp 20 is on. The phase detecting circuit 51 outputs the start signal to the logic circuit 78 until the lamp 20 is on after receiving the start compensating signal. At the light adjusting control circuit 84, the voltage of the light adjusting signal input is compared with the output voltage of a built-in triangular wave oscillating circuit and generates a burst light adjusting signal of a predetermined period. The entire logic signal is turned ON and OFF according to a duty cycle of this signal to control the brightness as a result. This method makes it possible to freely adjust from turning-off the light to totally turning-on the light, but as the lamp 20 is set to be ON-OFF by a period of the light adjusting signal, a start confirmation and a positive start become necessary for the period. For this reason, the start compensating circuit 88, as described in the foregoing, in to materialize the positive lighting, sends the start compensating signal to the phase detecting circuit 51 in the first place. The operation of the start compensation is described by referring to FIG. 4. That is, when the power source is switched on or the lamp is not turned on, for example, the switching elements 52, 58 are turned ON with a predetermined pulse width so that the electric current flows in the direction of I1. With this arrangement, the electric current flows to the capacitor (C1) and the primary winding of the transformer 10, and the signal is transmitted to the phase detecting circuit 51 through the lead wire 27 and the electric current flows alternately I2, I1, I2, I1, and the self oscillation circuit starts the oscillation with the detected resonance frequency. The start compensating circuit 88 produces an initial period set (at start up time) of the logic circuit 78. In a case where the lamp 20 does not light, a reset is again required and the initial start signal is transmitted to the logic circuit 78 through the phase detecting circuit 51. A lamp open short detecting circuit 89 is connected to secondary side of the winding type transformer 10 to detect the voltage and the electric current at the secondary side. In a case where the lamp 20 is not lit or the lamp 20 is not installed, namely, a condition where the wiring of the lamp is open or the lamp 20 is short circuited, namely, a lamp short, the signal is sent to the logic circuit 78 through the phase detecting circuit 51, and the control circuit consisting of the logic circuit 78, PWM control circuit 76 and the gate control circuits 68, 70, 72, 74 is constructed to be shut off. The overcurrent detecting circuit 86 sends the signal to the logic circuit 78 when the PWM control circuit 76 is inoperative or the wiring of the lamp 20 is short circuited to shut off the control circuit.

For reference, in FIG. 4, the logic circuit 78 constitutes the control circuit that outputs the output signal of the phase detecting circuit 51 as the drive signal for controlling the on-off of the switching elements 52, 54, 56, 58. Furthermore, the switching elements 52, 54, 56, 58 and the gate control circuits 68, 70, 72, 74 constitute a drive circuit that causes the turn-on or turn-off of the switching elements on the basis of the feedback signal of the resonance voltage at the primary side which is induced in the primary winding at the input side of the winding type transformer 10 and converts the energizing direction to the winding type transformer 10 of the DC power source in positive and negative direction by the on-off and inputs as the AC signal to the primary winding side at the input side of the winding type transformer 10.

In the foregoing construction, the power source switch is turned on, and when the on signal is instantly supplied to either of the gate control circuits 68, 74 or 72, 70 from the PWM control circuit 76 and the logic circuit 78, the DC power source is supplied in the direction of I1 through the switching elements 52, 58 or in the direction of I2 through the switching elements 56, 54 to allow the flow of the electric current to the winding at the primary winding of the winding type transformer 10. With this energization, the self oscillation circuit is activated and the winding type transformer 10 generates the resonance voltage. The frequency of the resonance voltage at the primary side of the winding type transformer 10 is supplied to the phase detecting circuit 51 by the lead wire 27. The logic circuit 78 and the PWM control circuit 76 drive the gate control circuits 68, 70, 72, 74 on the basis of the phase signal from the phase detecting circuit 51 to control the turn-on and turn-off of the switching elements 52, 54, 56, 58. The electric current flows alternately in the directions of I1 and I2 by the on and the off of the switching elements 52, 54, 56, 58, and the self oscillation circuit generates the self oscillation with the resonance frequency at the primary side of the winding type transformer 10.

For reference, in those embodiments, the resonance frequency at the primary side of the winding type transformer 10 is produced from the primary side of the winding type transformer 10 through the lead wire 27, but is not particularly limited to this construction. The resonance frequency at the primary side can be detected from the resonance frequency at the secondary side of the winding type transformer by a frequency analyzing circuit and the logic circuit 78 or the PWM control circuit 76 or the like may be operated by the detecting signal.

Figure 5:
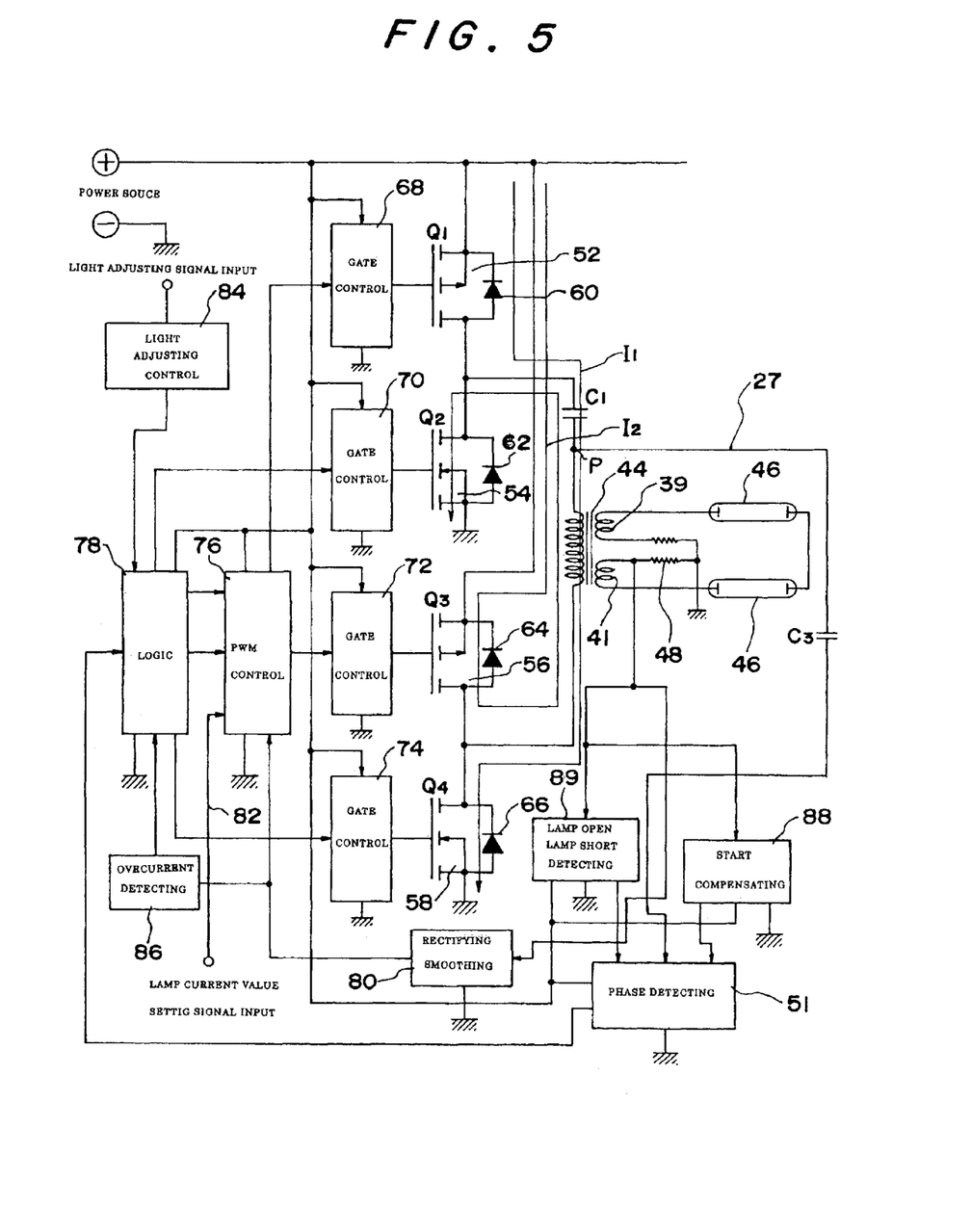
FIG. 5 is a block circuit diagram of a self oscillation circuit showing another embodiment of the present invention.

As described in the foregoing, the present invention is capable of obtaining the resonance voltage higher than the input power source voltage at the primary side of the winding transformer whereby the number of windings at the secondary side of the winding type transformer can be reduced, and its miniaturization becomes feasible. For this reason, the winding type transformer for use in the present invention is almost equal in size to the winding transformer of normal one input one output type, and becomes the one input two output type winding transformer. An embodiment of the self oscillation circuit using the winding type transformer of the one input two output type winding transformer is described in the following by referring to FIG. 5.

Numeral 44 denotes a winding type transformer of the one input two output type, wherein two cold cathode type fluorescent lamps 46, 46 are connected in series, and the other terminals of the fluorescent lamps 46, 46 are respectively connected to high voltage terminal sides of secondary side coils 39, 41 of the winding type transformer 44. The other terminals of the secondary side windings 39, 41 is respectively grounded by means of resistors. One resistor 48 constitutes an electric current detecting circuit, and is connected to the lamp open lamp short detecting circuit 89 and the start compensating circuit 88 by means of lead wires. Other constructions are identical with the construction illustrated in FIG. 5, and the identical parts are given identical codes.

In the foregoing construction, as the high voltage of the winding at the secondary side of the transformer 44 is applied to terminal electrodes of the two fluorescent lamps 46, 46, there is no unevenness in the luminance. As shown in FIGS. 1 through 4, in the case of using the winding transformer of one input one output type, one electrode side of the fluorescent lamp 20 is grounded, but in this case, the voltage at the ground side of the fluorescent lamps is lowered resulting in the grounded side of the fluorescent lamp being darker and in unevenness in the luminance.

Figure 6:
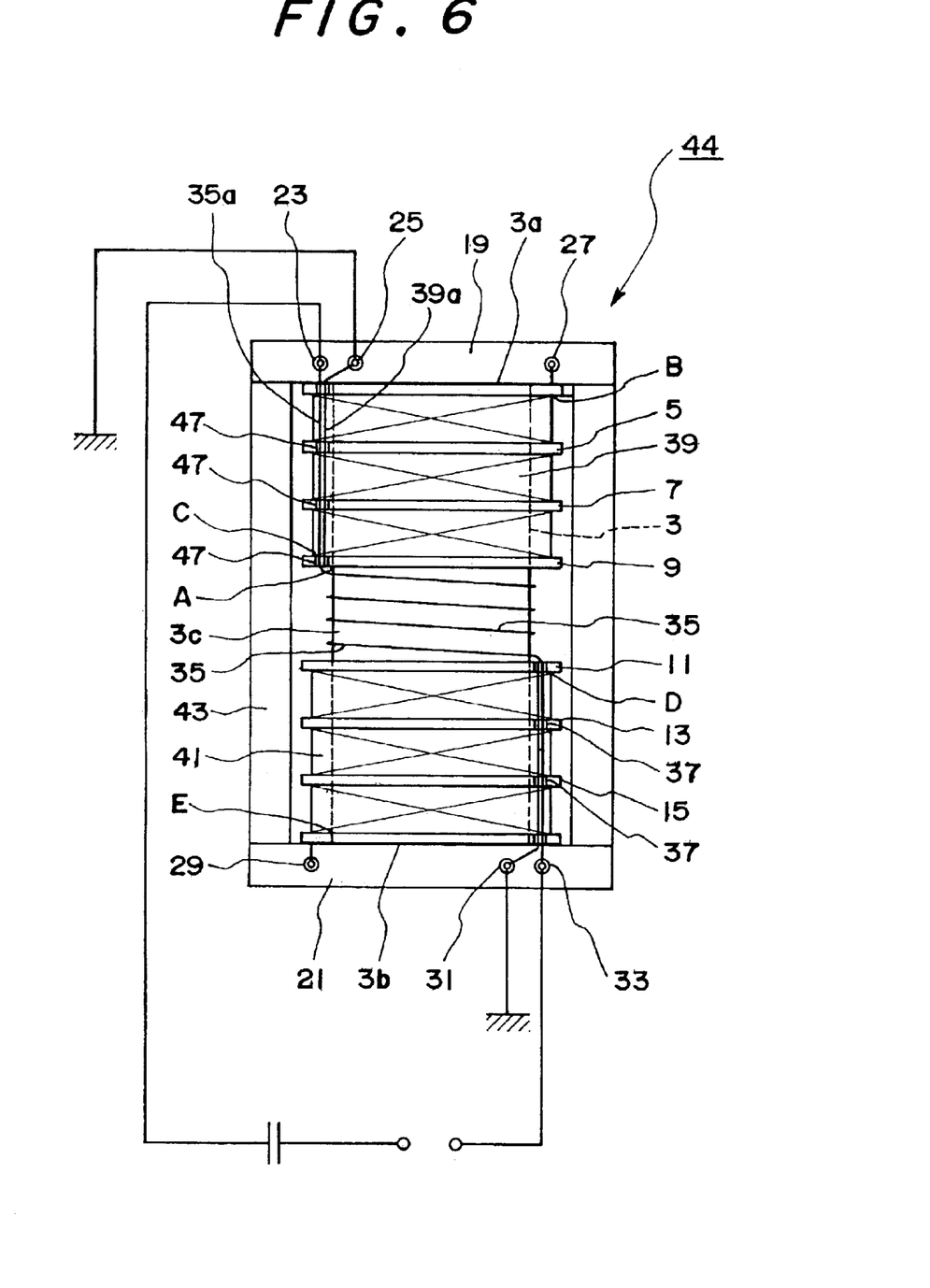
FIG. 6 is an explanatory drawing of a winding type for use in the present invention.
Figure 7:
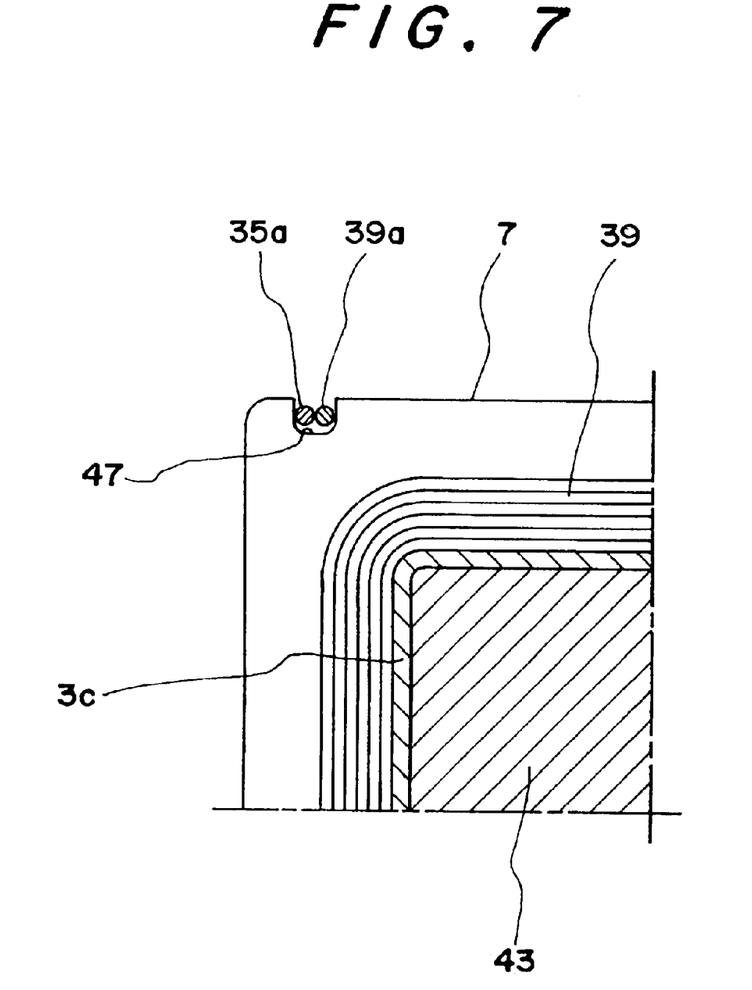
FIG. 7 is an explanatory drawing of a cross section of a part of a winding type transformer.
Figure 8:
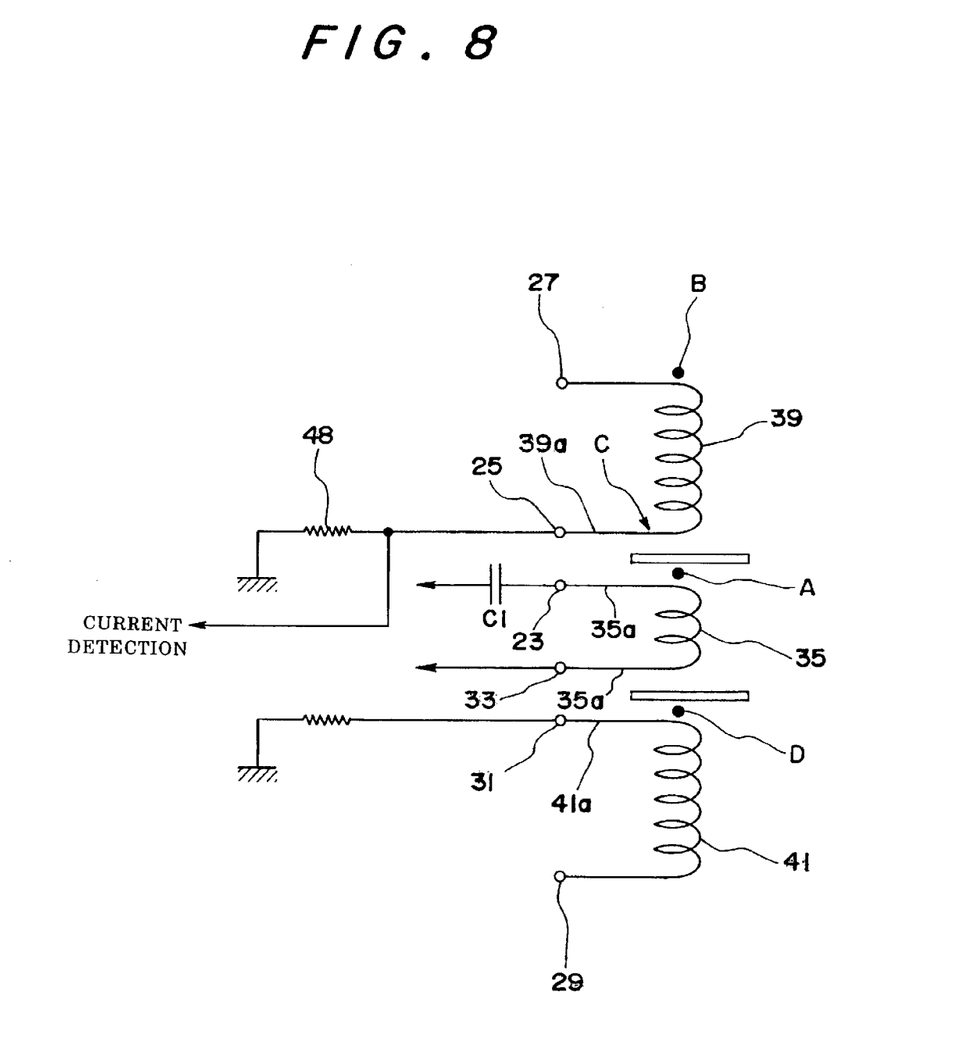
FIG. 8 is an explanatory drawing of a winding type transformer.

Next, a construction of the winding type transformer 44 of the one input two output, type is described by referring to FIGS. 6 through 8.

In FIGS. 6 and 7, numeral 3 is a bobbin of the winding type transformer, and brim portions 3a, 3b are formed at both ends of an angular cylindrical portion 3c. At the angular cylindrical portion 3c of the bobbin 3, a plurality of plate type partitions 5, 7, 9, 11, 13, 15 of square shape for insulation pressure resistance are fitted and arranged at a predetermined interval, and a concave portion for the winding is formed with the brim portions 3a, 3b, angular cylindrical portion 3c, and partitions 5, 7, 9, 11, 13, 15. At the brim portions 3a, 3b, terminal bases 19, 21 are fixed, and terminals 23, 25, 27, 29, 31, 33 are fixed to the bases. At the terminal base 19 at one end side of the bobbin 3, a secondary high voltage terminal 27 is disposed at its one side, and a primary input terminal 23 and a ground terminal 25 are disposed at the other side. The primary input terminal and the ground terminal 25 are disposed at the other side of the terminal base 19 with an utmost, possible distance, so that influence of the high voltage of the secondary high voltage terminal 27 is not applied to the terminals. At the terminal base 21 of the other end side of the bobbin 3, a secondary high voltage terminal 29 is disposed at its side, and a primary input terminal 33 and a ground terminal 31 are disposed at the other side being apart from the terminal. At the outer edges of the partitions 5, 7, 9, 11, 13, 15, grooves 47, 37 are formed for leading the lead wire of the winding to the primary input terminal 23, ground terminal 25 and primary input terminal 33 and ground terminal 31 from the central portion of the bobbin 3.

In the concave portion of the center of the bobbin 3, one end side A is a winding start, and a primary winding 35 is wound, for example, clockwise. A lead wire 35a of the winding start end side A of the primary winding 35 is led to one end side of the bobbin 3 through the groove 47 formed at the partitions 9, 7, 5 and the outer edge portion of the brim portion 3a, and is connected to the input terminal 23 of the primary side. The lead wire 35a at the end side of the primary winding 35 is led to the other end side of the bobbin 3 through the groove 37 formed on the partitions 11, 13, 15 and the outer edge portion of the brim portion 3b, and is connected to the input terminal 33 at the primary side. One end side B of the bobbin 3 is a winding start, and the first secondary winding 39 is wound clockwise, and is sequentially wound on each concave portion between the brim portion 3a and the partition 5, and between the partitions 5 and 7, between the partitions 7 and 9.

The reason for sectioning the mid portion of the secondary winding 39 with a plurality of partitions 5, 7 is based on a consideration of insulation pressure resistance of the secondary winding 39. The lead wire of the winding end side B of the first secondary winding 39 is connected to the secondary high voltage terminal 27 through the groove of the brim portion 3a. The lead wire 39a of the last end side C of the first secondary winding 39 is formed by bending three pieces and twisting them to form an enlarged diameter, is led to one end side of the bobbin 3 through the partitions 9, 7, 5 and the groove 47 of the brim portion 3a in parallel with the lead wire 35a of the primary winding 35, and is connected to the ground terminal 25. At the other side of the primary winding 35 of the center of the bobbin 3, the second secondary winding 41 is wound clockwise with the side D in contact with the partition 11 as a start of the winding sequentially in each concave portion between the partitions 11 and 13, between the partitions 13 and 15, and between the partition 15 and the brim portion 3b. The first and the second secondary windings 39, 41 disposed in symmetry in right and left directions of the primary winding 35 are of identical structures. The lead wire 41a of the winding start end side D of the second secondary winding 41 is formed by bending three pieces and twisting them to form an enlarged diameter as shown in FIG. 2, is led to the other end side of the bobbin 3 through the partitions 11, 13, 15 and the groove 37 of the brim portion 3b in parallel with the lead wire 35a of the primary winding 35, and is connected to the ground terminal 31. The lead wire of the last end side of the second secondary winding 41 is led to the groove of the other end side E of the brim portion 3b, and is connected to the secondary high voltage terminal 29. As it is obvious from the structure of the foregoing winding, both ends of the winding 35 of the primary side between the partitions 9 and 11 are in contact with the ground side of the secondary windings 39, 41 which is of low voltage, the difference between the voltage of the adjacent primary winding 35 and that of the secondary windings 39, 41 becomes small. For this reason, an insulation pressure resistance structure between the voltage of the primary winding 35 and the secondary windings 39, 41 can be made in a simple structure. The ground sides of the primary winding 35 and the secondary windings 39, 41 have a small potential difference so that there is no problem in the insulation pressure resistance even if both windings are arranged in parallel through the common grooves 37, 47. For this reason, there is no need for separately providing grooves for the lead wire of the primary winding 35 and the lead wire of the secondary windings 39, 41, which enables a simple fabrication and structure of the partitions and the miniaturization and the cost reduction of the transformer can be obtained. Numeral 43 denotes a core, which is disposed at the outside of the bobbin 3 and in the cylindrical portion 3c of the bobbin 3.

In the foregoing embodiment, the high resonance voltage is obtained at the primary side of the winding type transformer and the feedback winding becomes unnecessary so that the miniaturization of the winding type transformer can be achieved and at the same time, a highly efficient self oscillation circuit can be constructed.

Other embodiments of the present invention are described in the following.

Figure 9:
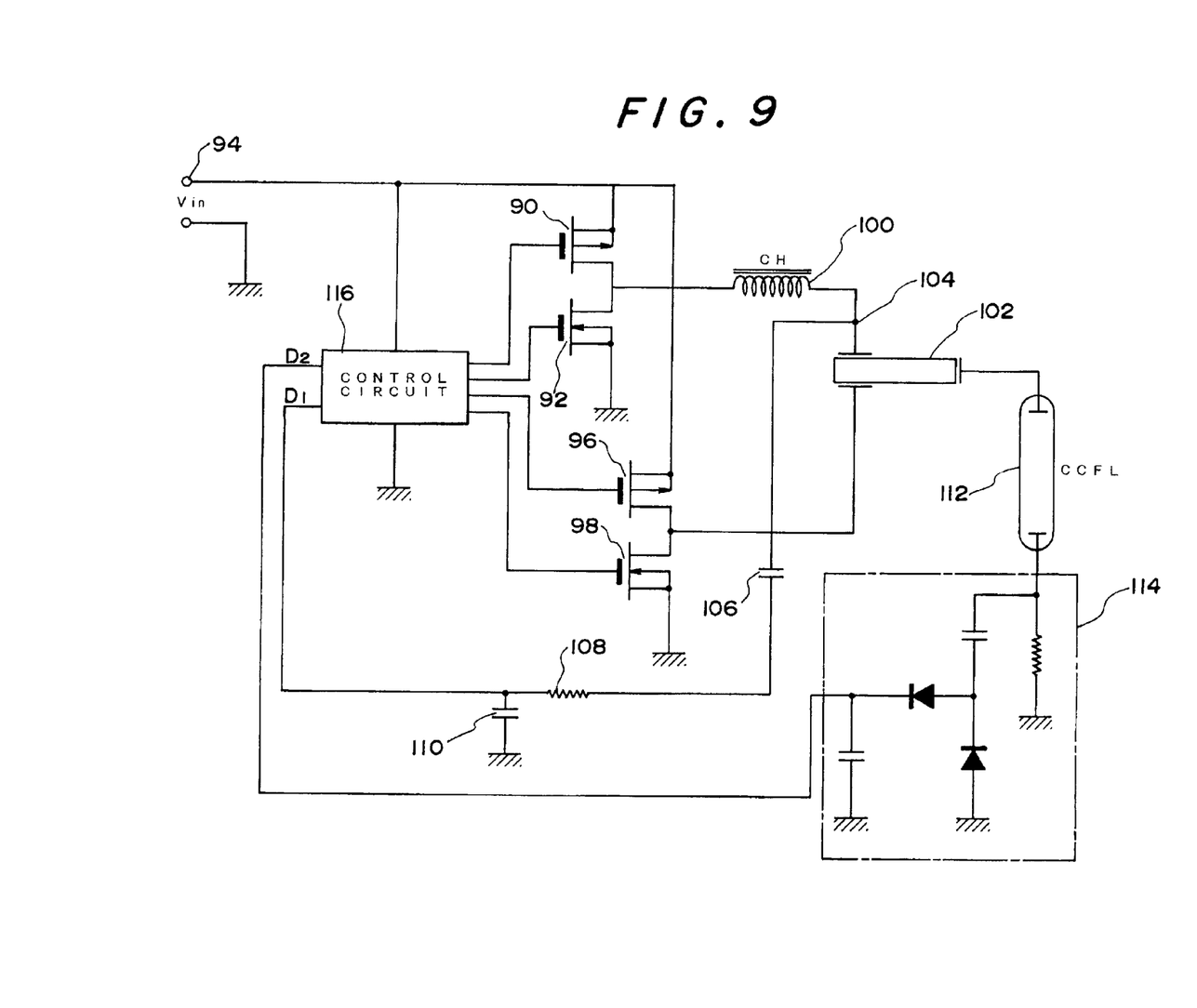
FIG. 9 is a block circuit diagram of a self oscillation circuit showing another embodiment of the present, invention.

In FIG. 9, semiconductor switching elements 90, 92 are connected in series between an input terminal 94 of the DC power source and ground, and semiconductor switching elements 96, 98 are similarly connected in series between the input terminal 94 and ground. The semiconductor switching element 96 and the semiconductor element 98 are mutually connected by their drains. Between a connecting point of the semiconductor switching elements 90 and 92 and a connecting point of the semiconduct or switching element 96 and the semiconductor switching element 98, an inductance 100 and a primary side of a piezoelectric transformer 102 are serially connected. The internal capacities of the inductance 100 and the piezoelectric transformer 102 constitute a series resonance circuit. A capacitor 106 for blocking DC and a phase detecting circuit consisting of a resistor 108 and a capacitor 110 are serially connected between a connecting point (a primary side terminal of the piezoelectric transformer 102), namely, a mid point, of a series resonance circuit 104, and ground. A cold cathode tube 112 that is the load is connected to the secondary side of the piezoelectric transformer 102. The cold cathode tube 112 is connected to a load electric current detecting circuit 114, and its output voltage is applied as an input being the feedback signal to a control circuit 116. The control circuit 116 generates a switching control signal on the basis of an output voltage D1 of the phase detecting circuit and an output voltage D2 of the load electric current detecting circuit 114, and the switching control signal is supplied to the gates of the semiconductor switching elements 90, 92, 96, 98. In this embodiment, the semiconductor switching elements 90, 92, 96, 98 form a bridge construction.

In the embodiment, according to the present invention as constructed in the foregoing, the semiconductor switching elements 90 and 96 or 92 and 98 are simultaneously energized and an oscillation electric current is supplied to the series resonance circuit. Furthermore, during a period where a the condition of the semiconductor switching elements 90 and 96 is OFF and the semiconductor switching elements 92 and 98 is simultaneously ON, the series resonance circuit keeps the condition of free vibration. Also the control circuit 116 receives the voltage signal D2 from the load electric current detecting circuit 114 that detects the electric current flowing in the load 112, and controls a conductance angle of the semiconductor switching elements 90 and 96 so that a level of this signal D2 becomes a target value to be separately provided. The target value is given from outside, whereby the control of the electric power that is supplied to the load 112 becomes possible and it is possible to utilize the control for purposes such as light adjusting or the like.

Figure 10:
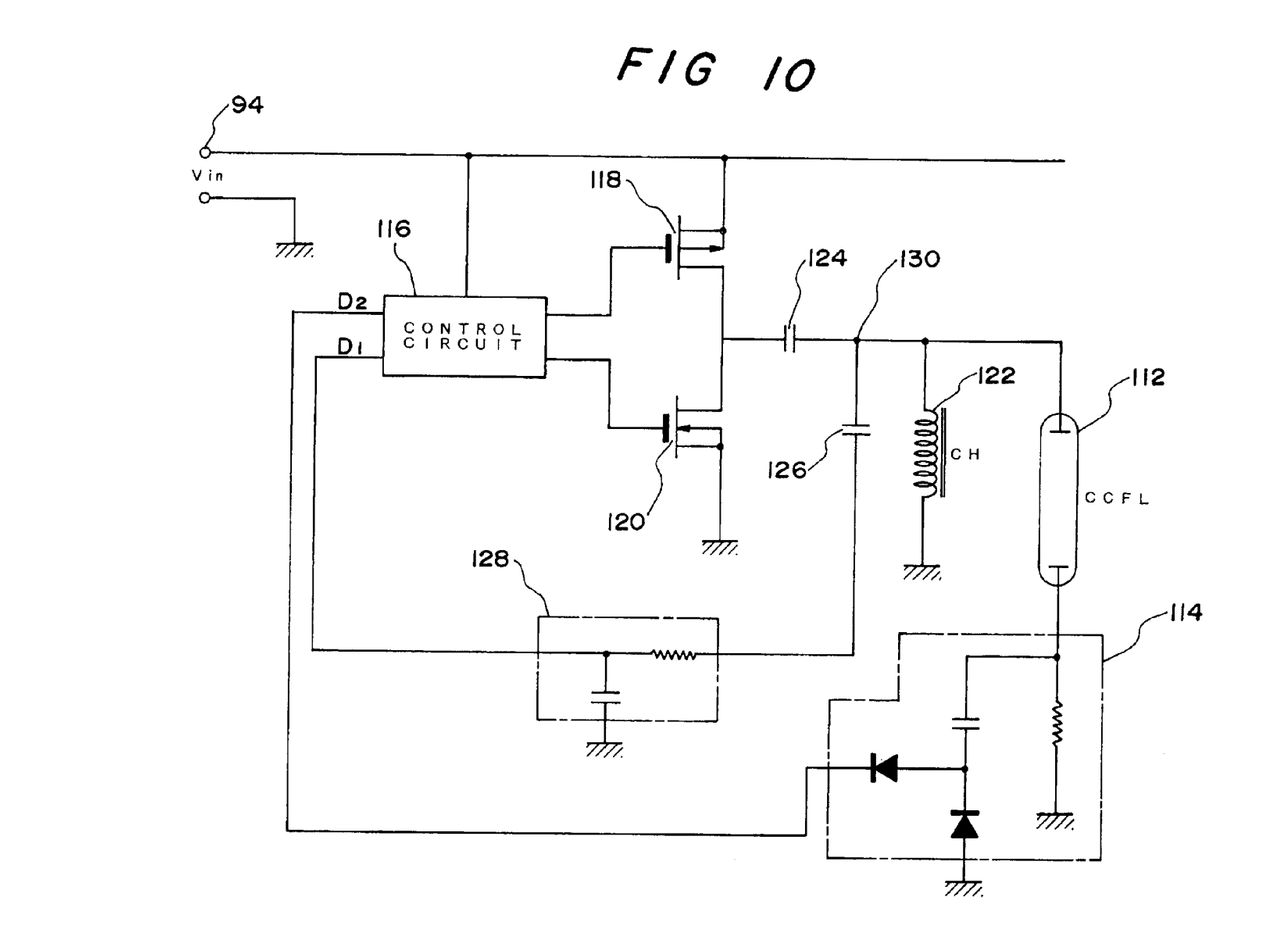
FIG. 10 is a block circuit diagram of a self oscillation circuit showing another embodiment of the present invention.

Another embodiment of the present invention will be described in the following by referring to FIG. 10. The embodiment takes a discharge tube that starts to discharge with a relatively low voltage, such as a fluorescent lamp, as an object, but the load is not limited to the discharge tube. In this embodiment, a connecting relationship of the input terminal 94 of the DC power source, semiconductor switching elements 118 and 120, and a control circuit 116 is same as in FIG. 9. Furthermore, an inductor 122 and a capacitor 124 are connected between a connecting point of a semiconductor switching element 118 and a semiconductor switching element 120 and ground to form a series resonance circuit. A capacitor 126 for blocking DC and a phase detecting circuit 128 are connected in series between a connecting point of the inductor 122 and the capacitor 124 and ground. The construction of the phase detecting circuit 128 and the connecting relationship with the control circuit 116 are same with the FIG. 9. Furthermore, the discharge tube 112 that is the load and the load electric current detecting circuit 114 are connected in parallel to the inductor 122, and its output voltage D2 is applied to the control circuit 116 as the feedback signal. The control circuit 116 receives the voltage signal D2 from the load electric current detecting circuit 114 that detects the electric current flowing in the load 112, and controls the conductance angle of the semiconductor switching element 118 so that the level of the signal D2 becomes the target value to be given separately. Because of the possibility of controlling the electric power that is applied to the load, it becomes possible to utilize the control for the purpose of light adjusting or the like.

According to the embodiments of the present invention set forth in the foregoing, since the semiconductor switching elements 118 and 120 are connected in series to the series resonance circuit, a voltage higher than the power source voltage is always not applied, and moreover, the on and off control is applied in the time band of a lower electric current value so that the stress to be applied to the semiconductor switching elements 118 and 120 is extremely small and the switching loss is also small which results in an improvement of the reliability and the efficiency correspondingly. Furthermore, even if the frequency of the series resonance circuit changes according to the change of the load condition, the oscillation frequency automatically follows as the feature of the self oscillations, whereby stable and strong sine wave oscillation can be sustained. In particular, in a case where the load is the discharge tube, a high voltage necessary for the start, is obtained by the resonance condition of high Q caused by the no-load condition before the start of the discharge. It is also feasible to reverse the order of connection of the inductor 122 and the capacitor 124 and the discharge tube 112 that is the load and the load electric current detecting circuit 114 may be connected to the capacitor 124 in parallel manner.

What is claimed is:

1. A self oscillation circuit for converting DC power to AC power said self oscillation circuit comprising:

an output transformer having a primary side and a secondary side, wherein the secondary side is adapted to have a load connected thereto;

an LC primary side resonance circuit formed at the primary side of the output transformer;

a switching circuit operable to turn on and off the DC power, the switching circuit having a drive circuit operable to turn the switching circuit on and off based on a feedback signal of a primary side resonance voltage induced in the LC primary side resonance circuit and convert the DC power to the AC power to drive the output transformer, a phase detecting device operable to detect a phase signal of a resonance wave form at the primary side of the output transformer as the feedback signal and output the phase signal, and a control circuit operable to output a drive signal that controls the on-off of the switching circuit based on the phase signal; and a start compensating circuit operable to detect a current flowing to the load and supply a start signal for self oscillation to the control circuit before the current flows to the load at a time of conversion of the DC power to the AC power.

2. The self oscillation circuit according to claim 1, wherein the LC primary side resonance circuit is a series resonance circuit, and the primary side resonance voltage is taken from a mid point of the series resonance circuit to match a phase with a resonance electric current, and the control circuit operates based on the feedback signal.

3. The self oscillation circuit according to claim 1, wherein the output transformer is a one input, two output winding transformer comprising a bobbin, a primary winding wound on a center of the bobbin, and first and second secondary windings disposed at opposite sides of the primary winding, respectively.

4. A self oscillation circuit for converting DC power to AC power, said self oscillation circuit comprising:

a piezoelectric transformer having a primary side and a secondary side, wherein the secondary side is adapted to have a load connected thereto;

an inductor connected to the primary side of the piezoelectric transformer, wherein the inductor and the piezoelectric transformer form an LC primary side resonance circuit; and a switching circuit operable to turn on and off the DC power, the switching circuit having a drive circuit operable to turn the switching circuit on and off based on a feedback signal of a primary side resonance voltage induced in the LC primary side resonance circuit and convert the DC power to the AC power to drive the piezoelectric transformer, a phase detecting device operable to detect a phase signal of a resonance wave form at the primary side of the piezoelectric transformer as the feedback signal and output the phase signal, and a control circuit operable to output a drive signal that controls the on-off of the switching circuit based on the phase signal, wherein the drive circuit comprises four switching elements arranged as a full bridge, the control circuit being operable to output the drive signal to control the four switching elements.

5. A self oscillation circuit for converting DC power to AC power, said self oscillation circuit comprising:

a series resonance circuit including an inductor and a capacitor, the series resonance circuit being adapted to have a load connected thereto; and a switching circuit operable to turn on and off the DC power, the switching circuit being connected to the series resonance circuit, and the switching circuit having a drive circuit operable to turn the switching circuit on and off based on a feedback signal of a resonance voltage induced in the series resonance circuit and convert the DC power to the AC power to drive the series resonance circuit, a phase detecting device operable to detect a phase signal of a resonance wave form at the series resonance circuit as the feedback signal and output the phase signal, and a control circuit operable to output a drive signal that controls the on-off of the switching circuit based on the phase signal, wherein the capacitor is connected in series with the switching circuit and the inductor is connected in parallel with the load.

* * * * *

UNITED STATES PATENT AND TRADEMARK OFFICE
CERTIFICATE OF CORRECTION

PATENT NO. : 6,747,421 B2
DATED : June 8, 2004
INVENTOR(S) : Kazuo Kohno

It is certified that error appears in the above-identified patent and that said Letters Patent is hereby corrected as shown below:

<u>Title page,</u>
Item [76], Inventor, please amend the inventors name as follows:
-- Kazuo Kohno --

Signed and Sealed this

Sixteenth Day of November, 2004

JON W. DUDAS
*Director of the United States Patent and Trademark Office*